US009531828B2

(12) United States Patent
Brown et al.

(10) Patent No.: US 9,531,828 B2
(45) Date of Patent: *Dec. 27, 2016

(54) POLICY PROXY

(75) Inventors: Michael Kenneth Brown, Fergus (CA);
Neil Patrick Adams, Waterloo (CA);
Herbert Anthony Little, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 27 days.

This patent is subject to a terminal disclaimer.

(21) Appl. No.: 13/570,709

(22) Filed: Aug. 9, 2012

(65) Prior Publication Data

US 2012/0303786 A1     Nov. 29, 2012

Related U.S. Application Data

(63) Continuation of application No. 12/058,684, filed on Mar. 29, 2008, now Pat. No. 8,261,338, which is a continuation of application No. 11/097,356, filed on Apr. 4, 2005, now Pat. No. 7,356,539.

(51) Int. Cl.
*H04L 29/06* (2006.01)
*H04L 29/08* (2006.01)

(52) U.S. Cl.
CPC .......... *H04L 67/28* (2013.01); *H04L 63/0853* (2013.01); *H04L 63/20* (2013.01)

(58) Field of Classification Search
CPC .... H04L 63/0281; H04L 63/20; H04L 65/105; H04L 67/28
See application file for complete search history.

(56) References Cited

U.S. PATENT DOCUMENTS

| | | | |
|---|---|---|---|
| 4,170,998 A * | 10/1979 | Sauder | 607/104 |
| 5,721,781 A | 2/1998 | Deo et al. | |
| 6,192,131 B1 | 2/2001 | Geer et al. | |
| 6,317,829 B1 | 11/2001 | Van Oorschot | |
| 6,345,098 B1 | 2/2002 | Matyas et al. | |
| 6,460,138 B1 | 10/2002 | Morris | |
| 6,539,093 B1 | 3/2003 | Asad et al. | |
| 6,611,863 B1 * | 8/2003 | Banginwar | 709/220 |
| 6,643,751 B2 | 11/2003 | Rosenquist et al. | |

(Continued)

FOREIGN PATENT DOCUMENTS

| | | |
|---|---|---|
| WO | 01/27821 | 4/2001 |
| WO | 03/028313 | 4/2003 |

(Continued)

OTHER PUBLICATIONS

Smart Card Alliance, RFID Tags and Contactless Smart Card Technology: Comparing and Contrasting Applications and Capabilities, Apr. 28, 2005 Apr. 28, 2005.

(Continued)

*Primary Examiner* — Michael R Vaughan
(74) *Attorney, Agent, or Firm* — Integral IP; Miriam Paton; Amy Scouten

(57) ABSTRACT

In a system with a policy server, a first device able to communicate with the policy server and a second device able to communicate with the first device and unable to communicate with the policy server, the first device is to act as a policy proxy. The policy server may push to the first device a policy for the second device, and the first device may push the policy to the second device.

16 Claims, 3 Drawing Sheets

(56) References Cited

U.S. PATENT DOCUMENTS

| | | | |
|---|---|---|---|
| 6,751,659 B1* | 6/2004 | Fenger et al. | 709/223 |
| 6,772,225 B1* | 8/2004 | Jennings et al. | 709/240 |
| 6,810,479 B1 | 10/2004 | Barlow et al. | |
| 6,816,900 B1 | 11/2004 | Vogel et al. | |
| 6,859,827 B2* | 2/2005 | Banginwar | 709/223 |
| 6,942,147 B2 | 9/2005 | Lahteenmaki et al. | |
| 7,016,666 B2 | 3/2006 | Lauper et al. | |
| 7,035,259 B2 | 4/2006 | Nomura et al. | |
| 7,039,802 B1 | 5/2006 | Eskicioglu et al. | |
| 7,082,102 B1* | 7/2006 | Wright | 370/229 |
| 7,096,204 B1 | 8/2006 | Chen et al. | |
| 7,096,495 B1* | 8/2006 | Warrier et al. | 726/15 |
| 7,114,178 B2 | 9/2006 | Dent et al. | |
| 7,124,938 B1 | 10/2006 | Marsh | |
| 7,170,998 B2 | 1/2007 | McLintock | |
| 7,213,068 B1* | 5/2007 | Kohli et al. | 709/225 |
| 7,243,230 B2 | 7/2007 | England et al. | |
| 7,290,146 B2 | 10/2007 | Ekers et al. | |
| 7,296,149 B2 | 11/2007 | Hiltgen | |
| 7,308,706 B2 | 12/2007 | Markham et al. | |
| 7,340,531 B2 | 3/2008 | Rasheed et al. | |
| 7,374,100 B2 | 5/2008 | Jei et al. | |
| 7,660,803 B2 | 2/2010 | Jin | |
| 7,882,274 B2 | 2/2011 | Peterson | |
| 7,907,896 B2 | 3/2011 | Chitti | |
| 7,937,704 B2 | 5/2011 | McKee | |
| 7,954,144 B1* | 5/2011 | Ebrahimi et al. | 726/12 |
| 2001/0019554 A1 | 9/2001 | Nomura et al. | |
| 2001/0019954 A1* | 9/2001 | Lim et al. | 455/424 |
| 2001/0039576 A1* | 11/2001 | Kanada | 709/223 |
| 2002/0026578 A1 | 2/2002 | Hamann et al. | |
| 2002/0165006 A1 | 11/2002 | Haller et al. | |
| 2002/0172177 A1* | 11/2002 | Gooch | 370/338 |
| 2003/0041244 A1 | 2/2003 | Buttyan et al. | |
| 2003/0126236 A1* | 7/2003 | Marl et al. | 709/220 |
| 2003/0195957 A1* | 10/2003 | Banginwar | 709/223 |
| 2003/0217166 A1* | 11/2003 | Dal Canto et al. | 709/229 |
| 2004/0064575 A1 | 4/2004 | Rasheed et al. | |
| 2004/0083382 A1 | 4/2004 | Markham et al. | |
| 2004/0260760 A1* | 12/2004 | Curnyn | 709/201 |
| 2005/0008163 A1* | 1/2005 | Leser et al. | 380/281 |
| 2005/0015621 A1* | 1/2005 | Ashley et al. | 713/201 |
| 2005/0028006 A1* | 2/2005 | Leser et al. | 713/200 |
| 2005/0039019 A1 | 2/2005 | Delany | |
| 2005/0086175 A1 | 4/2005 | Brique et al. | |
| 2005/0118951 A1* | 6/2005 | Poursabahian et al. | 455/41.2 |
| 2005/0120106 A1 | 6/2005 | Albertao | |
| 2005/0138387 A1 | 6/2005 | Lam et al. | |
| 2005/0273850 A1* | 12/2005 | Freund | 726/14 |
| 2006/0047962 A1 | 3/2006 | Adams et al. | |
| 2006/0072456 A1 | 4/2006 | Chari et al. | |
| 2006/0183462 A1 | 8/2006 | Kolehmainen | |
| 2006/0213982 A1 | 9/2006 | Cannon et al. | |
| 2006/0218396 A1 | 9/2006 | Laitinen | |
| 2006/0224742 A1* | 10/2006 | Shahbazi | 709/226 |
| 2006/0224901 A1 | 10/2006 | Lowe | |
| 2006/0225123 A1* | 10/2006 | Childress et al. | 726/1 |
| 2006/0236117 A1 | 10/2006 | Lazaridis et al. | |
| 2006/0286969 A1 | 12/2006 | Talmor et al. | |
| 2007/0057057 A1 | 3/2007 | Andresky et al. | |
| 2007/0180499 A1 | 8/2007 | Van Bemmel | |
| 2007/0192610 A1 | 8/2007 | Chun et al. | |
| 2007/0300059 A1 | 12/2007 | Yoneda | |
| 2008/0046739 A1 | 2/2008 | Adams et al. | |
| 2009/0093247 A1 | 4/2009 | Srinivasan | |
| 2009/0158032 A1 | 6/2009 | Costa | |
| 2009/0199001 A1 | 8/2009 | Barriga | |
| 2010/0077466 A1 | 3/2010 | Lowe | |
| 2011/0167470 A1* | 7/2011 | Walker et al. | 726/1 |

FOREIGN PATENT DOCUMENTS

| | | | |
|---|---|---|---|
| WO | WO 03028313 A2 * | 4/2003 | |
| WO | 2005048524 | 5/2005 | |
| WO | 2005106618 | 11/2005 | |

OTHER PUBLICATIONS

HID Global, "HID Virtual Products—idBank", 2008.
HID Corp., "How an HID Card is "Read"", 2005.
HID Corp., "Smart Cards for Access Control Advantages and Technology Choices", Smart Cards for Access Control Advantages and Technology Choices, published 2005 2005.
Chan, K. et al., "COPS Usage for Policy Provisioning (COPS-PR)", Mar. 2001.
Ekberg, Jan-Erik et al., "Nokia Research Center, On-board Credentials with Open Provisioning", Aug. 29, 2008.
Gai, Silvano et al., "QoS Policy Framework Architecture", IETF Standard-working-draft, Internet Engineering Task Force, IETF, CH, Feb. 10, 1999 XP015035137 ISSN: 0000-0004 chapters 2, 2.1, 2.1.5, 2.1.2.1, 2.3, 2.3.3, 4.2, 6 Feb. 10, 1999 , 1-16.
IBM, "Tivoli Access Manager, Base Installation Guide, version 5.1", chapter 1, p. 7 Nov. 2003.
Mian, Ali, First Office Action for CA 2,539,998, May 14, 2010.
Phanse, K S. et al., "Design and demonstration of policy-based management in s multy-hop ad hoc network", Ad Hoc Networks, Elsevier, vol. 3, No. 3 Nov. 29, 2003 pp. 389-401 XP004848804 ISSN: 1570-8705 Nov. 29, 2003 , 1-16.
Rosken, Wilfried, Examination Report for EP 05102623.5, Nov. 22, 2006.
Rosken, W, Extended European Search Report for EP 05102623.5, Oct. 5, 2005.
Smart Card Alliance, Using Smart Cards for Secure Physical Access, published Jul. 2003, publication number: ID-03003 Jul. 2003.
Holmes, Angela R., First Office Action for U.S. Appl. No. 13/093,898, Sep. 13, 2013, United States Patent and Trademark Office.
Ghotra, Sandeep S. et al., "Secure Display and Secure Transactions Using a Handset", IEEE, Sixth International Conference on the Management of Mobile Business (ICMB 2007).
Holmes, Angela R., Notice of Allowance for U.S. Appl. No. 13/093,898, Apr. 23, 2014.
Nakra, Suchita, First Office Action for CA 2,787,977, Mar. 31, 2014.
Othman, Hanunah et al., "Forming Virtualized Secure Framework for Location Based Services (LBS) using Direct Anonymous Attestation (DAA) protocol", IEEE, Second International Workshop on Network Assurance and Security Services in Ubiquitous Environments, 2010.
Holmes, Angela R., Second Office Action for U.S. Appl. No. 13/093,898, Feb. 14, 2014.
Oliveira, Joel Extended European Search Report for EP 11163667. 6, Mar. 7, 2014.
Siddiqui, Imran, First Office Action for CA 2,738,157, Dec. 16, 2013.
Oliveira, First Exam Report for EP11163667.6 Nov. 11, 2015.
Atkinson, Third Office Action for CA2738157 Feb. 3, 2016.
Nakra, Second Office Action for CA2787977 May 28, 2015.

\* cited by examiner

POLICY PROXY

CROSS-REFERENCE TO RELATED APPLICATIONS

This application is a continuation of U.S. patent application Ser. No. 12/058,684 filed Mar. 29, 2008, which issued on Sep. 4, 2012 as U.S. Pat. No. 8,261,338, which in turn is a continuation of U.S. patent application Ser. No. 11/097,356 filed Apr. 4, 2005, which issued on Apr. 8, 2008 as U.S. Pat. No. 7,356,539, the contents of which are incorporated herein by reference in their entirety.

BACKGROUND OF THE INVENTION

In an organization, an Information Technology (IT) administrator may create IT policies to control the electronic devices in the organization, such as computers, laptops, cellphone, personal digital assistants, printers, and the like. A policy server may store the various IT policies, and may push the relevant IT policy directly to the devices in the organization. Alternatively, the devices may contact the policy server directly to obtain their IT policy.

The organization may include electronic devices that are unable to connect to the policy server. The IT administrator may manually configure each such electronic device according to the established IT policy. However, this is time-consuming and may lead to errors if the manual configuration does not match the intended policy. Moreover, some electronic devices may not include a user interface that is suitable for enabling configuration according to an IT policy.

The IT administrator may also develop IT policies for electronic devices that do not belong to the organization but that communicate with a device that does belong to the organization, or have installed thereon software for use with devices that belong to the organization. Since these devices do not belong to the organization, they may be unable to connect to the policy server and the IT administrator may not have any physical access to them.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
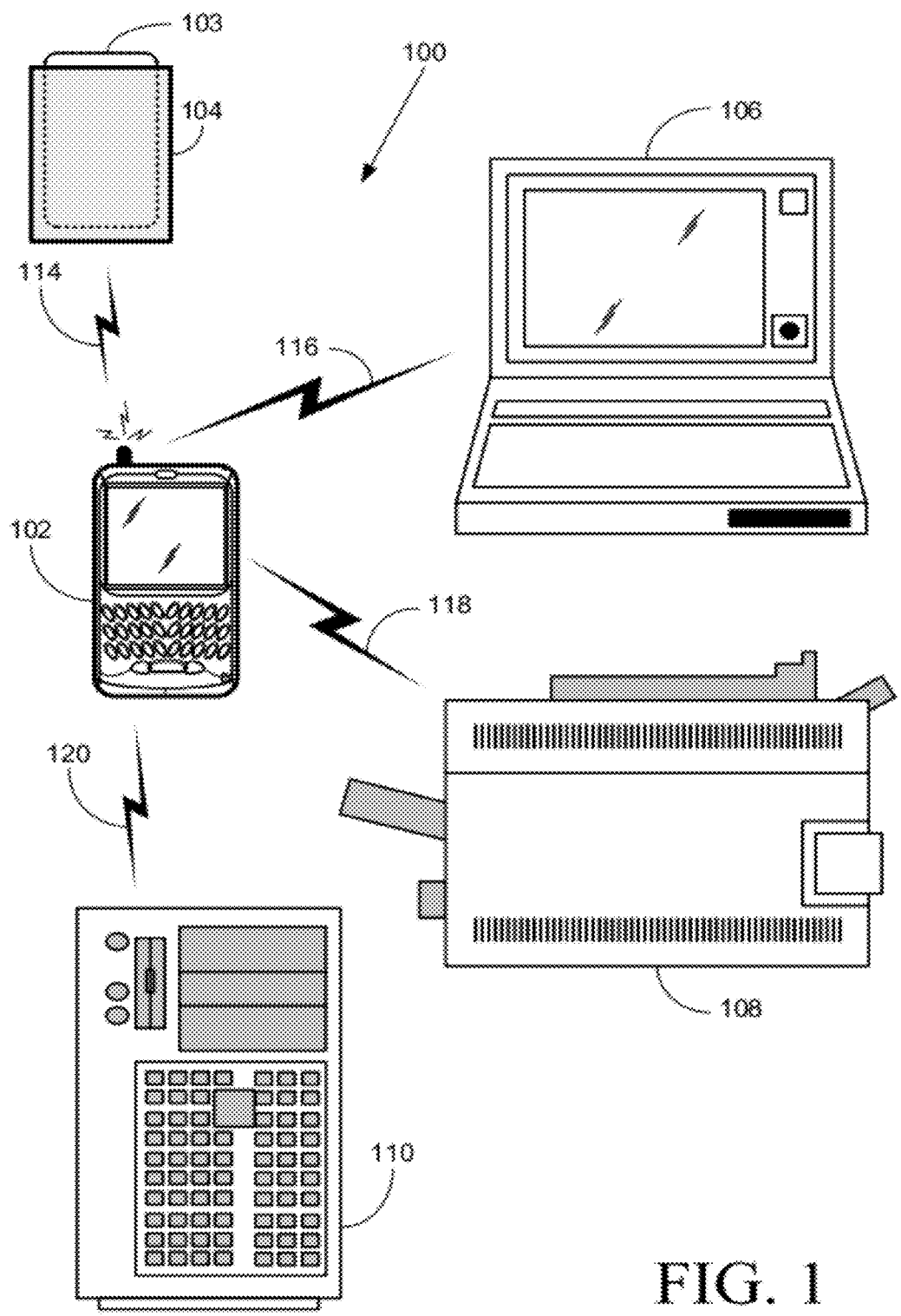
FIG. 1 is a schematic diagram of an exemplary system, according to some embodiments of the invention.

FIG. 1 is a schematic diagram of an exemplary system, according to some embodiments of the invention. A system 100 includes a device 102 and a policy server 110. An IT administrator may store one or more policies on policy server 110. One or more of the policies stored on policy server 110 may apply to device 102, and policy server 110 may push the one or more policies that apply to device 102 over a communication link 120. Device 102 may contact policy server 110 over communication link 120 to request the one or more policies that apply to device 102.

System 100 may also include other devices for which the IT administrator has stored policies on policy server 110. For example, these other devices may include a smart card reader 104, a personal computer 106, and a printer 108, which may be able to communicate with device 102 over communication links 114, 116 and 118, respectively. A smart card 103 is shown inserted into smart card reader 104. Smart card reader 104 and printer 108 may be considered peripherals of device 102, and one or more software applications for use with device 102 may be installed on personal computer 106.

Device 102 may be a mobile device, and communication link 120 may include a segment that is a wireless communication link. For example, communication link 120 may include a cellular telephony link. A non-exhaustive list of examples of cellular telephony standards for the cellular telephony link includes Direct Sequence—Code Division Multiple Access (DS-CDMA), Global System for Mobile Communications (GSM), North American Digital Cellular (NADC), Time Division Multiple Access (TDMA), Extended-TDMA (E-TDMA), wideband CDMA (WCDMA), General Packet Radio Service (GPRS), Enhanced Data for GSM Evolution (EDGE), 3.5G and 4G. In another example, communication link 120 may include a wireless local area network link. A non-exhaustive list of examples of wireless local area network standards for the wireless local area network link includes the Institute of Electrical and Electronic Engineers (IEEE) for Wireless LAN MAC and Physical layer (PHY) 802.11 a, b, g and n specifications or future related standards, the Bluetooth® standard, the Zigbee™ standard and the like.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device.

The person whose security information is stored on smart card 103 may use smart card reader 104 for identification and to digitally sign and/or decrypt messages sent by device 102. Smart card reader 104 may communicate with device 102 over a wireless communication link 114, for example, a Bluetooth® communication link.

A non-exhaustive list of examples of what an IT policy for smart card reader 104 may include is a) under what circumstances confidential information stored at smart card reader 104 is deleted, b) with which devices smart card reader 104 is allowed to communicate, c) the number of incorrect smart card login attempts before smart card reader 104 is locked, and d) which algorithms smart card reader 104 is allowed to use to protect wireless communication link 114. However, smart card reader 104 may lack a user interface that is suitable for configuring this policy in smart card reader 104. Also, smart card reader 104 may be unable to communicate with policy server 110. Policy server 110 may communicate a policy for smart card reader 104 to device 102, and device 102 may communicate the policy to smart card reader 104.

Printer 108 may be a local printer that communicates with device 102 over wireless communication link 118, for example, a Bluetooth® communication link. A non-exhaustive list of examples of what an IT policy for printer 108 may include is a) font or template information on how to print out forms of the organization, b) printer resolution (e.g., dots per inch), and c) which devices printer 108 is allowed to connect to. Printer 108 may be unable to communicate with policy server 110. Policy server 110 may communicate a policy for printer 108 to device 102, and device 102 may communicate the policy to printer 108.

Personal computer 106 may be a home computer of a person who belongs to the organization, and may have a software application installed thereon for use with device 102. An IT policy for personal computer 106 may, for example, affect how the software application operates. Policy server 110 may communicate a policy for personal computer 106 to device 102, and device 102 may communicate the policy to personal computer 106.

In general, policy server 110 may communicate to device 102 a policy for another device that is able to communicate with device 102 and unable to communicate with policy server 110, and device 102 may communicate the policy to the other device. Device 102 may contact policy server 110 over communication link 120 to request one or more policies for the other device. Device 102 may collect information regarding which other devices it is communicating with and may report that information to policy server 110. Device 102 may also send a confirmation back to policy server 110 once a policy received at device 102 and communicated to another device is applied at the other device.

Figure 2:
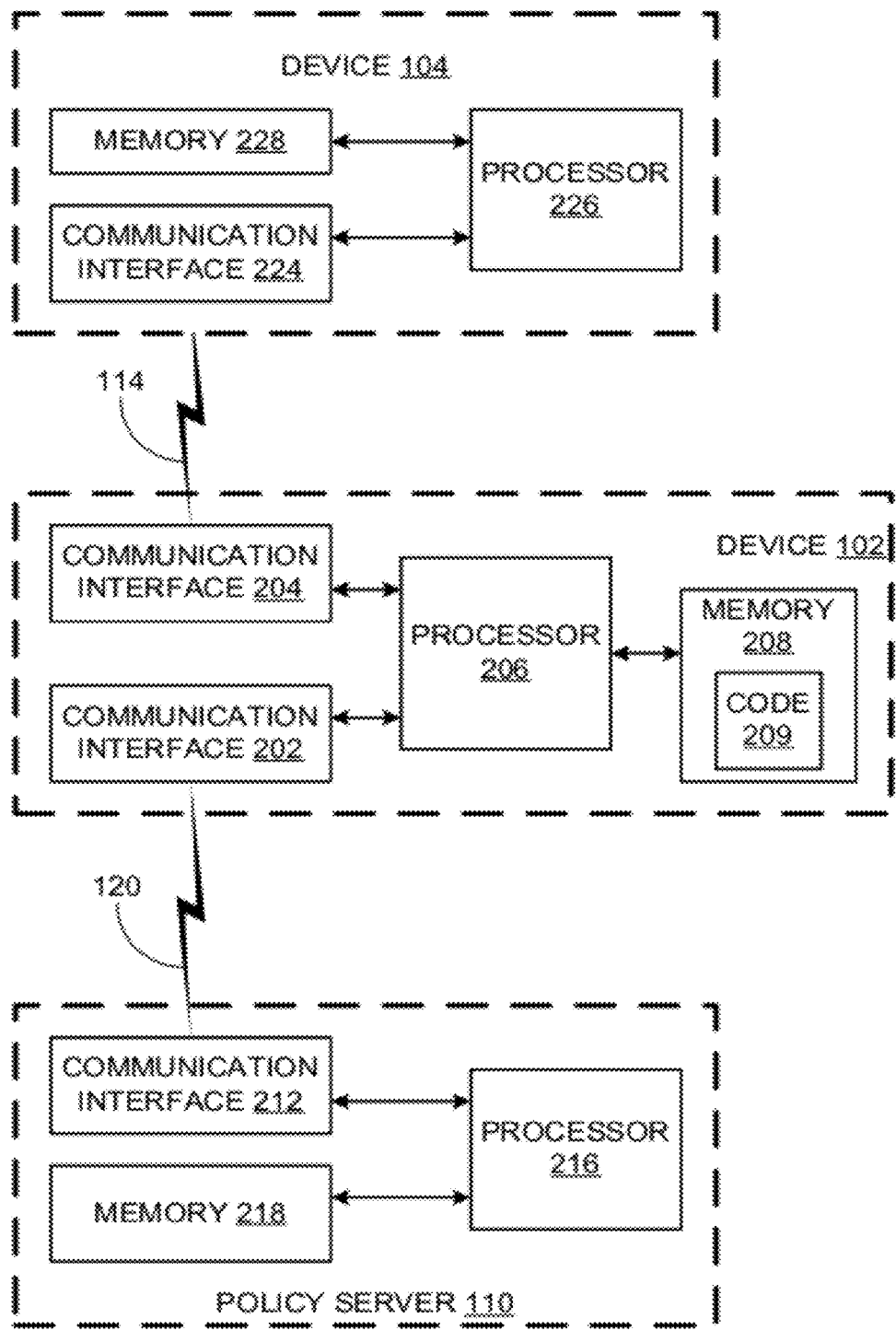
FIG. 2 is a block diagram of some component of the exemplary system of FIG. 1, according to some embodiments of the invention.

FIG. 2 is an exemplary block diagram of policy server 110, device 102 and device 104, according to some embodiments of the invention.

Device 102 may include a communication interface 202 through which device 102 is able to receive a policy from policy server 110. Device 102 may also include a communication interface 204 through which device 102 is able to transmit all or a portion of the policy to device 104. Communication interface 202 may be compatible, for example, with a wireless local area network standard or with a cellular telephony standard. Communication interface 204 may be compatible, for example, with the Bluetooth® standard.

Device 102 may also include a processor 206 coupled to communication interface 202 and to communication interface 204. Device 102 may also include a memory 208, coupled to processor 206. Memory 208 may store executable code 209 to be executed by processor 206. Memory 208 is able to store one or more policies received from policy server 110.

Policy server 110 may include a communication interface 212, a processor 216 coupled to communication interface 212, and a memory 218 coupled to processor 216. Memory 218 is able to store IT policies.

Device 104 may include a communication interface 224, a processor 226 coupled to communication interface 224, and a memory 228 coupled to processor 226. Memory 228 is able to store one or more policies received from device 102. Communication interface 224 may be compatible with the same standard as communication interface 204.

Figure 3:
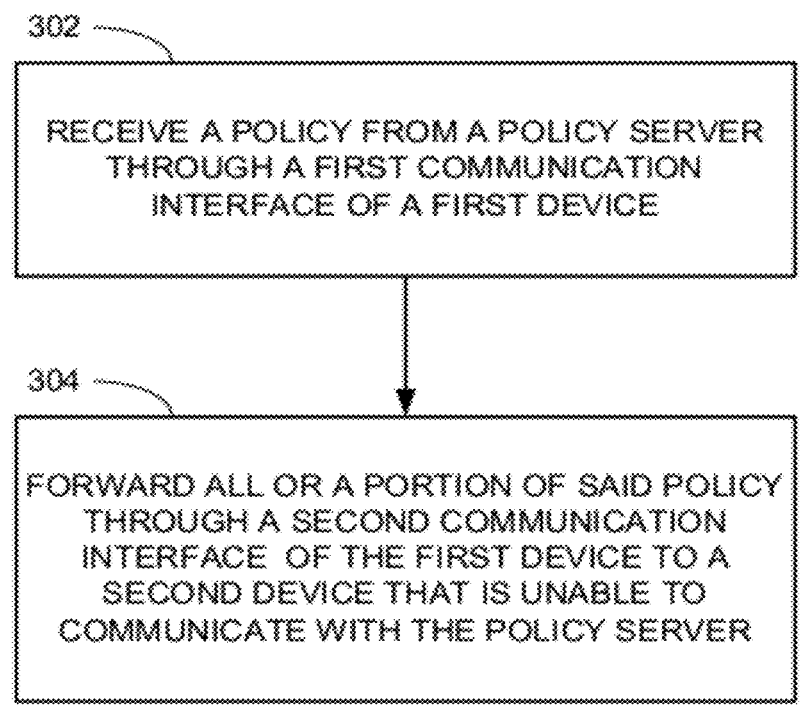
FIG. 3 a flowchart of an exemplary method, according to some embodiments of the invention.

FIG. 3 is a flowchart of an exemplary method to be implemented by device 102, according to some embodiments of the invention. Executable code 209, when executed by processor 210, may cause device 102 to implement the method of FIG. 3.

At 302, device 102 receives a policy from policy server 110 through communication interface 202 over communication link 120. At 304, device 102 transmits all or a portion of the policy through communication interface 204 to another device that is unable to communicate with policy server 110.

A non-exhaustive list of examples for device 102 includes a cellular phone, a personal digital assistant (PDA), an electronic mail (Email) client, a gaming device, a laptop computer, a notebook computer, a desktop computer, a server computer, and any other suitable apparatus.

A non-exhaustive list of examples for processors 206, 216 and 226 includes a central processing unit (CPU), a digital signal processor (DSP), a reduced instruction set computer (RISC), a complex instruction set computer (CISC) and the like.

Memories 208, 218 and 228 may be fixed in or removable from device 102, policy server 110 and device 104, respectively. A non-exhaustive list of examples for memories 208, 218 and 228 includes any combination of the following:
  a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
  b) optical devices, such as compact disk read only memory (CD ROM), and the like; and
  c) magnetic devices, such as a hard disk, a floppy disk, a magnetic tape, and the like.

Processors 206, 216 and 226, and memories 208, 218 and 228 are functional blocks and may be implemented in any physical way in device 102, policy server 110 and device 104, respectively. For example, processor 206 and memory 208 may each be implemented in a separate integrated circuit, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method performed by a policy server, the method comprising:
  sending a first policy to a first electronic device via a first communication interface device associated with the first electronic device, the first policy for application on the first electronic device to configure operation of the first electronic device;

receiving a request from the first electronic device via the first communication interface device associated with the first electronic device, the request being for a second policy to apply on a second electronic device that is devoid of a user interface for enabling configuration of the second electronic device and that is not capable of direct communication with the policy server, and the request comprising information collected by the first electronic device regarding the second electronic device; and sending the second policy to the first communication interface device of the first electronic device to cause the first electronic device to transmit the second policy via a second communication interface device associated with the first electronic device to the second electronic device, the second communication interface device being at least one of separate from and distinct from the first communication interface device, and wherein the first policy is distinct from the second policy.

2. The method of claim 1, further comprising:
receiving a confirmation from the first communication interface device of the first electronic device that all or a portion of the second policy has been applied on the second electronic device.

3. The method of claim 1, wherein the first electronic device is a mobile electronic device.

4. The method of claim 3, wherein the mobile electronic device is selected from the group consisting of cellular phones, personal digital assistants, electronic mail clients, gaming devices, laptop computers, notebook computers, and desktop computers.

5. The method of claim 1, wherein the first communication interface device is compatible with a local area network standard and wherein the second communication interface device is compatible with a Bluetooth standard.

6. The method of claim 1, wherein the first electronic device is a server computer.

7. A policy server comprising:
a processor; and
a memory coupled to the processor, the memory storing policies and instructions executable by the processor, the instructions being configured to:
send a first policy of the policies to a first electronic device via a first communication interface device associated with the first electronic device, the first policy for application on the first electronic device to configure operation of the first electronic device;
receive a request from the first electronic device via the first communication interface device associated with the first electronic device, the request being for a second policy of the policies to apply on a second electronic device that is devoid of a user interface for enabling configuration of the second electronic device and that is not capable of direct communication with the policy server, and the request comprising information collected by the first electronic device regarding the second electronic device; and
send the second policy to the first communication interface device of the first electronic device to cause the first electronic device to transmit the second policy via a second communication interface device associated with the first electronic device to the second electronic device, the second communication interface device being at least one of separate from and distinct from the first communication interface device, and wherein the first policy is distinct from the second policy.

8. The policy server of claim 7, wherein the instructions are further configured to:
receive from the first electronic device, via the first communication interface device, a confirmation that all or a portion of the second policy has been applied on the second electronic device.

9. The policy server of claim 7, wherein the first communication interface device is compatible with a local area network standard and wherein the second communication interface device is compatible with a Bluetooth standard.

10. The policy server of claim 7, wherein the first electronic device is a server computer.

11. The policy server of claim 7, wherein the first electronic device is a mobile electronic device selected from the group consisting of cellular phones, personal digital assistants, electronic mail clients, gaming devices, laptop computers, notebook computers, and desktop computers.

12. A non-transitory storage medium containing instructions, comprising:
first instructions that, when executed, cause a policy server to send a first policy to a first electronic device via a first communication interface device associated with the first electronic device, the first policy for application on the first electronic device to configure operation of the first electronic device;
second instructions that, when executed, cause the policy server to receive a request from the first electronic device via the first communication interface device associated with the first electronic device, the request being for a second policy to apply on a second electronic device that is devoid of a user interface for enabling configuration of the second electronic device and that is not capable of direct communication with the policy server, and the request comprising information collected by the first electronic device regarding the second electronic device; and
third instructions that, when executed, cause the policy server to send the second policy to the first communication interface device of the first electronic device for transmission of the second policy by the first electronic device to the second electronic device via a second communication interface device associated with the first electronic device, the second communication interface device being at least one of separate from and distinct from the first communication interface device, and wherein the first policy is distinct from the second policy.

13. The non-transitory storage medium of claim 12, further comprising fourth instructions that, when executed, cause the policy server to receive a confirmation from the first communication interface device of the first electronic device that all or a portion of the second policy has been applied on the second electronic device.

14. The non-transitory storage medium of claim 12, wherein the first communication interface device is compatible with a local area network standard and wherein the second communication interface device is compatible with a Bluetooth standard.

15. The non-transitory storage medium of claim 12, wherein the first electronic device is a server computer.

16. The non-transitory storage medium of claim 12, wherein the first electronic device is a mobile electronic device selected from the group consisting of cellular phones, personal digital assistants, electronic mail clients, gaming devices, laptop computers, notebook computers, and desktop computers.

* * * * *